(12) United States Patent  
Kroll et al.

(10) Patent No.: US 8,243,355 B2
(45) Date of Patent: Aug. 14, 2012

(54) DYNAMIC WAVEFRONT SHAPING UNIT

(75) Inventors: Bo Kroll, London (GB); Armin Schwerdtner, Dresden (DE); Gerald Futterer, Dresden (DE)

(73) Assignee: SeeReal Technologies S.A., Munsbach (LU)

(*) Notice: Subject to any disclaimer, the term of this patent is extended or adjusted under 35 U.S.C. 154(b) by 120 days.

(21) Appl. No.: 12/738,668

(22) PCT Filed: Oct. 16, 2008

(86) PCT No.: PCT/EP2008/063946
§ 371 (c)(1),
(2), (4) Date: Apr. 19, 2010

(87) PCT Pub. No.: WO2009/050225
PCT Pub. Date: Apr. 23, 2009

(65) Prior Publication Data
US 2010/0231999 A1 Sep. 16, 2010

(30) Foreign Application Priority Data

Oct. 19, 2007 (DE) .................. 10 2007 051 521

(51) Int. Cl.
*G02F 1/03* (2006.01)
*G02B 26/00* (2006.01)
(52) U.S. Cl. .................. 359/245; 359/237; 359/259
(58) Field of Classification Search .......... 359/245, 359/290–292, 295, 223–225, 243, 260–263, 359/298, 198, 301–303, 315–318, 237, 242, 359/253, 276, 238, 259, 244
See application file for complete search history.

(56) References Cited

U.S. PATENT DOCUMENTS

| | | | |
|---|---|---|---|
| 5,059,008 A * | 10/1991 | Flood et al. ............ | 359/196.1 |
| 7,271,962 B2 * | 9/2007 | Kasazumi et al. ....... | 359/707 |
| 7,733,557 B2 * | 6/2010 | Handschy et al. ....... | 359/279 |
| 2007/0133079 A1 | 6/2007 | Cernasov | |

FOREIGN PATENT DOCUMENTS

DE 10 2005 005 933 A1 8/2006
DE 10 2007 005 823 A1 8/2008
(Continued)

OTHER PUBLICATIONS

International Search Report, dated Feb. 5, 2009, and Written Opinion, issued in priority International Application No. PCT/EP2008/063946.

*Primary Examiner* — Dawayne A Pinkney
(74) *Attorney, Agent, or Firm* — Saul Ewing LLP

(57) ABSTRACT

An optical unit for dynamically shaping a wavefront is disclosed, having light modulation cells disposed regularly in cell fields, and locally influencing partial light waves in a propagating light wavefront. Each cell field is connected to a cell controller separately adjusting the optical behavior of the light modulator cells. Serially-disposed fields, each having modulator cells, are located in the light path of the light wavefront. Cell control means adjust the modulator cells in a first cell field such that the modulator cells discretely implement a phase shift having a continuous phase value, and in a second cell field such that the modulator cells implement a prism function having a continuous directional value for the partial light waves. A focusing means for the emitted wavefront is also located in the light path of the optical unit, guiding the partial light waves at an output pupil of the optical unit.

20 Claims, 3 Drawing Sheets

FOREIGN PATENT DOCUMENTS

| WO | WO 99/06856 | 2/1999 |
| WO | WO 2004/044659 A2 | 5/2004 |
| WO | WO 2005/006029 A1 | 1/2005 |
| WO | WO 2005/057250 A2 | 6/2005 |
| WO | WO 2005/069043 A1 | 7/2005 |
| WO | WO 2005/096069 A1 | 10/2005 |
| WO | WO 2007/096687 A1 | 8/2007 |
| WO | WO 2007/099456 A2 | 9/2007 |
| WO | WO 2007131817 A1 * | 11/2007 |

* cited by examiner

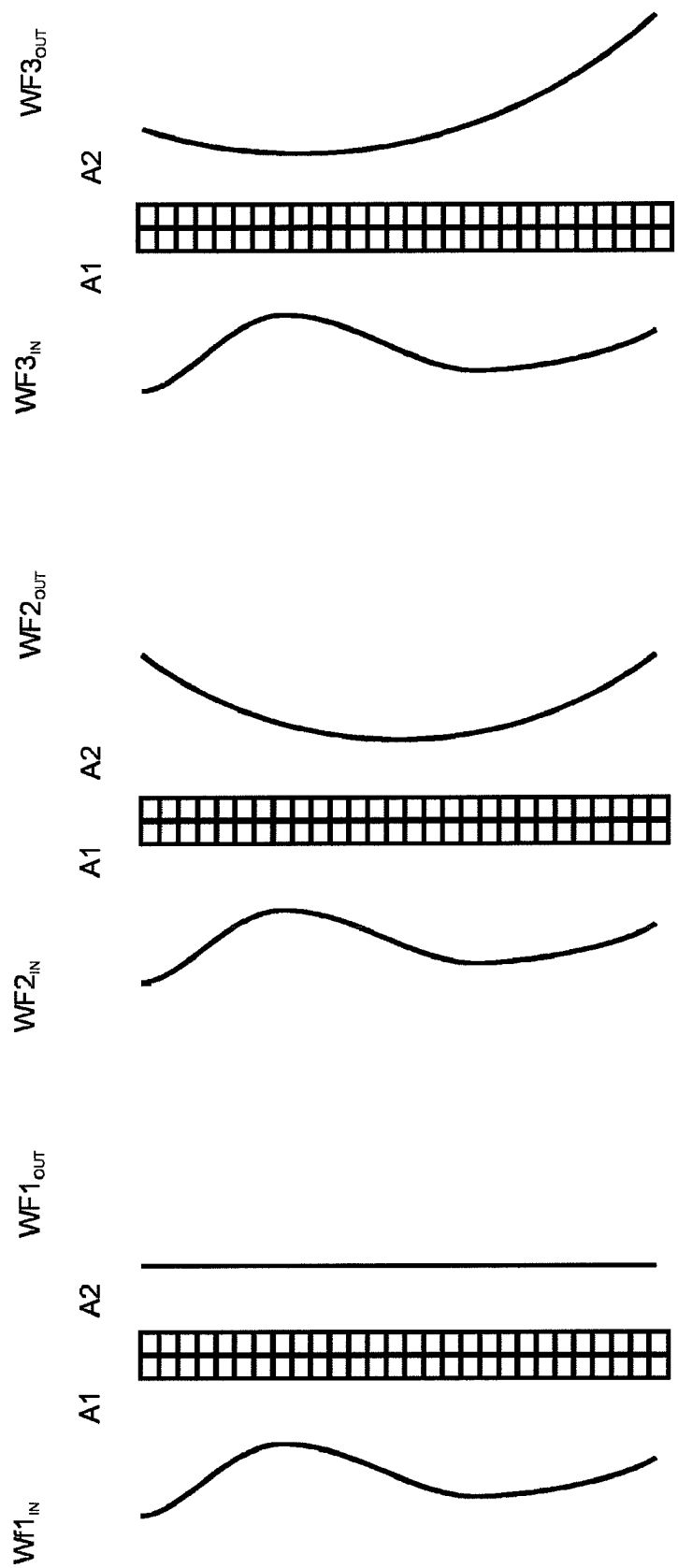

DYNAMIC WAVEFRONT SHAPING UNIT

CROSS REFERENCE TO RELATED APPLICATIONS

This application claims the priority of PCT/EP2008/063946, filed on Oct. 16, 2008, which claims priority to German Application No. 10 2007 051521.0, filed Oct. 19, 2007, the entire contents of which are hereby incorporated in total by reference.

BACKGROUND OF THE INVENTION

The present invention relates to an optical unit for dynamic wave forming with light modulator cells which are regularly arranged in cell arrays, said light modulator cells locally affecting partial light waves in a propagating light wave front. Each cell array is combined with a controller, which discretely controls the optical behaviour of the light modulator cells. This makes it possible to specifically adapt the form of the propagating light wave front locally so to shape a target form. In particular in high-resolution optical systems with large apertures, aberrations are disturbing and reduce the quality of the image presentation at the exit pupil of the system. With the aid of the optical unit, an adaptive optical system can for example be realised, in order to effectively compensate the aberrations in an optical imaging system with computer means.

Useful applications of the invention also include measuring and testing equipment in industrial production, for example if a process requires an adaptation of the focus to the form and condition of the material. Further, in optical networks with a flexible network structure, the invention can be used preferably to realise a variable assignment of connections to network hubs.

The invention can also be applied preferably in systems which holographically reconstruct objects, because holographic displays require display screens with apertures of a few decimeters in order to provide an adequately wide viewing angle for watching the reconstructions.

Further, both autostereoscopic and holographic systems often include means for finding eye positions and for directing and tracking light waves, which direct the modulated light for the autostereoscopic images or holographic reconstructions such that they exit the optical system at an oblique angle to the optical axis of the system, depending on the eye position.

Optical imaging systems which serve to present images or holographic reconstructions at high resolution and high luminous intensity often require several optical elements which have a wide aperture. This brings about locally varying aberrations in the beam path, where a combination of those known aberrations impairs the quality of the propagating light wave front at the point of exit of the system.

A 'wave front' is defined in the present document as an area of propagating light waves, on which during propagation through a propagation space all light points lie which have the same transit time from a transmitter, e.g. from a spatial light modulator SLM. A 'cell array' is defined in this document as the regular arrangement of modulator cells of a controllable spatial light modulator in a plane. It is not relevant for the subject matter of this invention whether the modulator cells are arranged in a matrix or in any other regular pattern, e.g. in a honeycomb pattern.

When large-area light waves propagate, there is the disadvantage that also ambient influences, such as fluctuations in temperature, humidity, composition and density of a medium in the propagation space, can dynamically change the portions of the above-mentioned aberrations in the wave front. If astronomical objects are observed with a telescope, for example, dynamic density fluctuations in the atmosphere can affect the optical condition of a received wave front. Those influencing factors change temporarily the refractive index and the aberrations of the optical system which modifies for example the image definition of an observed object dynamically. The blur is composed of the portion caused by the position displacement of the image in the viewing plane, and of a portion caused by the widening of imaged image points. The latter effect is described by a point spread function PSF, which defines the response of an optical system to a point light source or an object light point.

A similar problem is observed for example in a microscope. Also in this example it is desired to track the focus of the objective lens of the microscope quickly and/or to compensate local aberrations in the wave front.

In order to correct aberrations with computer means automatically and as promptly as possible, it is necessary to affect the form of the disturbed wave fronts adaptively with a minimum of mechanical movements involved. In the above-mentioned optical systems, the optical unit shall for example compensate the point spreading of as many as possible object light points and correct the extent of the object light points such that aberrations are eliminated as far as possible.

A similar problem is encountered in a system for the three-dimensional reconstruction of objects with a wave tracking for the propagating wave fronts. The wave tracking optically adapts the directions of propagation of the wave fronts to each current eye position of the corresponding observer eye, and tracks them if the eye position changes. In such a system, the light wave fronts propagate, depending on the observer positions, in propagation directions which are different from the optical axis of the system. This means that the directions of propagation run at different slanted angles to the optical axis and therefore cause aberrations with fluctuating portions.

The demands made on a holographic reconstruction as regards the capability of the wave fronts to generate interference additionally increase the necessity of reducing aberrations. To ensure that the modulated wave front reconstructs all light points of a three-dimensional scene as desired at the correct position, aberrations must be eliminated prior to the reconstruction. This requires for each possible eye position of an observer an aberration compensation which is adapted to that specific position. This problem can only be solved by a dynamically controllable wave front former.

Adaptive optical systems often take advantage of wave formers with a variably controllable, unstructured cell surface, i.e. a wave former with an optically continuous cell surface. For example, arrays with discretely moveable microelements are used whose inclination to the system axis can be individually adjusted electrically with the aid of motion means, and which are covered with a reflective membrane. Such a solution is disclosed for example in the publication WO 99/06856, titled "Microscope with adaptive optics system", where a conventional microscope is provided with an adaptive optical system in the observation or illumination beam path. The adaptive optical system changes locally the phase and/or amplitude of the light of a spatial wave front in a defined manner on the one hand, and displaces the focus in the object space on the other.

The document discloses both transmission-type wave front formers based on LCD panels and reflection-type wave front formers with flexible membranes, which are moved electrostatically, piezo-electrically or with the help of bending elements.

Compared with a structured arrangement, an unstructured cell surface of a wave front former has the advantage that there is no risk of the occurrence of light diffraction at the cell surface, which would again impair the quality of the emitted wave front because of loss of light and/or interaction of various diffraction orders.

Major disadvantages of unstructured cell surfaces include a low control speed and the fact that only very large curvature radii can be achieved, which will hardly be narrower than R=1 m. This limits the dynamic range in many applications, so that unstructured wave front formers can only be used under certain conditions.

With the international patent application having the publication no. WO 2007/099456, titled "Wave front forming device", the applicant has already sought protection for a two-dimensionally controllable, reflective wave front former which uses an array of discretely movable micro-mirror elements which have sizes of few micrometers. The wave front former has motion elements, which tilt or displace illuminated micro-mirror elements, or which perform a combination of those two movements, in order to set a structured reflection pattern mechanically. A hologram signal changes the reflection pattern by way of moving the micro-mirror elements at a fast pace and in synchronism of a video image frequency, thus generating a video sequence of hologram wave fronts in order to holographically reconstruct a moving scene in real-time. The reflection pattern reshapes the homogeneous wave form of incident light waves according to video hologram signals as a result of by locally different light reflections. The motion elements can move the micro-mirror elements by at least one full light wavelength.

The suggested device has the disadvantage that all movable mirror elements and a multitude of motion elements and the corresponding addressing means are all arranged together as an integrated circuit on a semiconductor substrate. This allows an effective former surface area of only few square centimeters, so that optical enlargement means are required for the wave fronts.

However, in contrast to an unstructured wave former, a wave former with a structured cell surface, in particular a spatial light modulator for phase modulation, is able to realise a high control speed and narrow curvature radii of few millimeters. As substantially smaller curvatures can thus be achieved, a structured wave former can realise a dynamic range which is ten times as large as that of an unstructured wave former, at a substantially higher spatial frequency.

Further, the international publication WO 2005/057250, titled "Variable focus system", discloses a focus system with a multitude of moveable optical elements, where an electronic controller switches the focus positions of an optical system between different focus settings. The controller can either switch the focal length of the system between several image planes, or switch between different focus directions which differ from the optical axis. In a special embodiment, the focus system is used in conjunction with a video monitor which serves as a three-dimensional image projector in order to serially generate spatially staggered image planes, which image three-dimensional representations which are floating freely in space. The movable optical elements can be reflective elements, which can be tilted laterally in two dimensions, or refractive optical elements.

Further, with the non-published patent application DE 10 2007 005 8235, titled "Optical wave front correction for a holographic imaging system", the applicant has already sought protection for a reconstruction system with a dynamic wave front former. The system images video holograms onto a display screen prior to reconstructing a scene. A position controller uses position information of current eye positions for controlling an optical wave tracking means such that the modulated light wave front appears at the desired eye position, irrespective of any changes in position. A controllable wave front former is disposed on the hologram side of the display screen. Based on position information that describes the current eye position, computer means adapt the optical behaviour of the wave front former such that the reconstructed scene exhibits the same geometry and optical quality, independent of the current position.

In contrast to the subject matter of the present application, the patent application DE 10 2007 005 8235 relates to using a unit for dynamic wave forming in a holographic imaging system—but not to its design features to suit manifold applications, for example for a direct-view display.

The international publication WO 2007/096687, titled "Diffraction gratings with tunable efficiency", discloses a light modulator which takes advantage of a cell array with diffraction gratings in order to discretely locally modulate the luminous intensity and/or to deflect the light path. Each diffraction grating comprises controllable electrowetting cells, which are disposed in the light path of a backlight. This light modulator also operates in a transmission mode. The electrowetting cells have control electrodes, which affect the adhesion of capillaries with an electric field through the surface tension, and thus control the filling level or the surface shape of optical media and thus the optical transmittance. For this, the wetting cells form a capacitor where the space between the electrodes is filled partly with a hydrophobic liquid material, such as oil, and partly with water. At least one of the electrodes is coated with a hydrophobic material. Without an electric field applied, the hydrophobic liquid medium covers the electrode as a film, and with an electric field applied, the water displaces the hydrophobic medium, because the electric field eliminates the polarisation of the dipoles in the water surface.

The light modulator is for example intended for applications in graphical colour displays, which can be operated in a direct-view or imaging mode, with fast response times and short refresh rates. In addition, it is also applicable in an autostereoscopic display with sequential image presentation, for a controllable beam splitter and for deflecting light beams.

A disadvantage of structured wave formers, which is known as such, is that they do not only direct the light in one desired diffraction order. Additional, parasitic diffraction orders always occur in spatial periodicity. Depending on the optical system which uses the wave former, the parasitic diffraction orders exhibit various negative properties, such as loss in luminous intensity and/or interaction among the individual diffraction orders. This is why spatial filters, such as aperture masks or light traps for suppressing parasitic diffraction orders are often disposed in the optical path of optical systems with structured wave formers.

Wave formers with phase gratings also exhibit the above-mentioned drawback of parasitic diffraction orders.

The term 'phase grating' is used in this document for an optical diffraction grating where the control signals for the modulator cells locally affect the phase, but not the amplitude, of the passing light wave. As any other diffraction grating, a phase grating can be designed in the form of a transmission-type or reflection-type grating. Compared with a cell array with controllable amplitude gratings, a cell array with controllable phase gratings has the advantage that in the ideal case there is no loss in brightness compared with the incident wave front when controlling the modulator cells, which means that the luminous intensity does not decrease caused by the control process in an ideal controllable phase grating.

A diffraction grating splits incident light waves into emitted elementary waves, which interfere with each other and thus create a spatial frequency spectrum depending on the spacing of the grating. The higher the grating constant the sharper are global maxima imaged by the spatial frequency spectrum, and the more local maxima are generated at a lower intensity. This increases the resolution.

Now, the problem with wave front formers with a controllable phase grating is that the diffraction grating always deflects the coherent light emitted by the illumination means in multiple directions. If the illumination of the phase grating hits its surface at right angles, large portions of the incident light will be deflected by the grating into the diffraction order +1, and into the diffraction order −1, which is symmetrical to the first diffraction order. Non-diffracted light and other, parasitic diffraction orders can be suppressed with the help of a known structure of the diffraction grating, e.g. by way of destructive interference. In addition, if the illumination is incident at right angles, higher orders, such as the diffraction orders +2 and +3, can occur as well.

Because the luminous intensities of the diffraction orders +1 and −1 are usually identical, and because a portion of the light is also directed into the other diffraction orders as described, the usable portion of the light is substantially lower than 50% of the incident light with a phase grating so illuminated.

A similar situation can be observed if the phase grating is illuminated under a different angle of incidence. In that case, the majority of the incident light will be emitted by the grating in identical portions both with the diffracted light and with the first diffraction order. If the light wavelength $\lambda$ is greater than the spacing of the grating, then no second order could exist, because the diffraction angle would be larger than 90°. In that configuration, disturbing diffraction orders can thus be eliminated without spatial filter means, and the available space behind the grating can be used for the propagation of the formed wave front. The grating period therein has about the magnitude of the wavelength.

However, controllable phase gratings with cell widths of a magnitude of the wavelength $\lambda$ of visible light are not yet commercially available in the required large sizes.

Another problem of controllable phase gratings is caused by a discontinuous control within the spatial frequency. A wave front which is emitted by a controllable phase grating cannot be controlled continuously between two adjacent diffraction orders. If it is for example required that with a phase grating a modulated wave front is directed at an arbitrary position of an exit pupil in a space, then the wave front cannot reach positions which are located outside the spatial frequency spectrum of the grating.

The term 'continuous' is used in this document if the cell controller means are preferably digital computer means which control the controllable phase gratings with quantised phase values or which set them to quantised deflection angles by way of a known analogue-digital conversion. A 'quasi continuity' of a cell control is thus achieved with a precision of quantification levels, which depend on the resolution of the computer means.

Despite the above-described disadvantages of the structured wave formers, it is not possible to do without those structured wave formers, in particular phase modulators, for example of phase gratings, because of the drawbacks of unstructured wave formers discussed above.

SUMMARY OF THE INVENTION

It is thus the object of the present patent application to provide an optical wave former for forming dynamic wave fronts with light modulator cells which are regularly arranged in cells arrays, said wave former avoiding the disadvantages of the prior art solutions. The wave former with a cell surface of any size, which can be controlled dynamically by a system controller at a refresh rate for the wave front of several hundreds of frames, shall in particular form a wave front almost free of any loss of light and direct this wave front continuously at an arbitrary position in a space. In order to achieve a great control dynamics, the wave former shall be able to realise bending radii of few centimeters at the desired refresh rate, and its cell surface shall have a size which makes the wave former suitable for an application in direct-view displays for holographic reconstructions of scenes with video holograms.

This object is solved according to this invention by an optical wave former unit, which is disposed in the light path of a light wave front, and which comprises one after another multiple dynamically controllable wave front formers, where each wave front former comprises at least one cell array with regularly arranged modulator cells for spatial light modulation, in order to control discretely both locally different phase shifts and different deflection angles of emitted partial light waves of a light wave front.

According to another feature of the invention, the wave former unit also comprises cell controller means which control the modulator cells of a first cell array such that each modulator cell of the cell array discretely realises a phase shift with a continuously controllable phase value, and that the modulator cells of a second cell array realise discretely controllable prism functions with a continuously controllable deflection angle for the partial light waves. The first cell array thus has the function of a controllable phase grating, while the other one has the function of a controllable micro-prism structure.

If a computer means, such as a digital signal processor, serves as the cell controller means, the two cell arrays can only conditionally be continuously controlled within the resolution of digital quantification values.

Another feature of the invention is that the wave former unit in the light path of the light wave front uses means which realise for the emitted wave front a focussing function, in order to direct the partial light waves in the exit pupil of the optical unit at a common position.

The focussing function can, if the incident wave front comprises collimated light, in the most simple case be a focussing field lens, for example a Fresnel lens, which is additionally physically disposed in the light path of the light wave front, but which does not necessarily have to be an integral part of the wave former unit. Alternatively, lenticulars or lens arrays are suited to realise the focussing function, if the function of the optical system in which the wave former unit is integrated, functionally allows the cell arrays to be illuminated in a segmented way.

According to a preferred embodiment of the invention, however, the focussing function can also be realised by way of encoding a cell array. For example, the cell controller means for encoding the modulator cells, which realise the controllable prism function, can superimpose an additional focussing function.

In order to save efforts for a large field lens, the wave former unit can, according to the invention, alternatively comprise another cell array which is encoded by the cell controller means with said focussing function. This solution boasts the advantage that the wave former unit can axially adapt the focal length of the used system in a dynamical way.

According to another embodiment of the invention, the efforts required for addressing the additional cell array can be avoided by using a further cell array where the control electrodes of the modulator cells are interlinked through separate hardware circuits.

The applications of the wave former unit usually require a focussing function, because the intensity of the transmitted light waves does not change in dependence on the control of the modulator cells with an ideal phase grating. The human eye can thus not perceive the modulation of a phase grating without optical aids. One possibility is to take advantage of the deflection function of a lens in order to project a diffraction image to the focus of the optical system, provided the incident wave fronts are plane and collimated.

The wave former unit according to the invention can in particular be used preferably for a holographic reconstruction system of a direct-view type, which focuses a wave front, which was formed by a sequence of phase holograms, on the eyes of observers.

The applicant has disclosed the principle of such a holographic reconstruction system for example in the international patent application WO 2004/044659, titled "Video hologram and device for reconstructing video holograms". The reconstruction system focuses a light wave front which is modulated by a sequence of video holograms into at least one visibility region. Each visibility region therein defines an eye position of at least one eye of an observer who watches the holographic reconstruction. Spatial light modulator means are encoded with the help of the video holograms such that the modulated wave front as a result of interference in the space between the spatial light modulator and the visibility region holographically reconstructs the light points of a three-dimensional scene.

The wave former unit according the invention boasts the advantage that a holographic reconstruction system can be realised without optical focussing means an without optical wave deflection.

A reconstruction system according to the international patent application WO 2004/044659 with the means of the present invention is designed such that the cell array, which is run as continuously controllable phase grating by the cell controller means, is encoded with a sequence of phase holograms by the cell controller means. The cell array which serves as controllable phase grating thus assumes the function of a spatial light modulator.

In contrast, the cell controller means encode the other cell array, which serves as a controllable micro-prism structure, such to continuously control with the discretely controllable prisms different deflection angles of the modulated partial wave fronts, and to direct the modulated partial wave fronts at an eye position which lies within a desired tracking range for observer eyes.

The wave front forming unit according to the invention allows by way of interaction of the two cell arrays that neither optical means for focussing nor for directing and tracking the modulated wave fronts are necessary in order to direct the modulated partial wave fronts at any desired eye position within the tracking range for observer eyes for a holographic reconstruction.

This has the advantage that wave fronts with diameters of several decimeters can be modulated and directed without the holographic reconstruction being disturbed by aberrations, which would occur when light of the wave fronts passes through optical elements at an oblique angle to the optical axis.

Another advantage of the wave former unit according to the invention is that the cell structures of the two cell arrays may be identical with respect to their geometry. The same type of cell array can thus be used for all cell arrays of the wave former unit.

The cell controller means alone can realise functional differences between the modulator cells of the cell arrays by way of different encoding.

Since both the imaging of images and the holographic reconstruction is usually carried out with two-dimensional, modulated wave fronts, it is preferred that at least in the cell array which realises the micro-prism function the control electrodes with circuits for addressing the modulator cells are designed such that the cell surfaces can be tilted laterally in two dimensions in order to reach all focus points which are located away from the optical axis of the system. This can typically be achieved in that those modulator cells are fitted with a double control electrode pair with circuits for direction-specific addressing of the modulator cells, which realise electric control fields which are twisted at right angles to each other and which can be controlled with separate control signals.

BRIEF DESCRIPTION OF THE DRAWINGS

Now, the present invention will be described in detail with the help of embodiments and accompanying drawings, wherein:

FIGS. 4a to 4c are graphic representations of differently formed emitted wave fronts, which are controlled with the aid of a wave former unit according to the invention.

DETAILED DESCRIPTION

Figure 1:
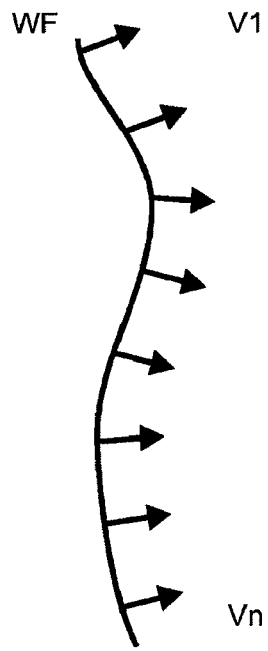
FIG. 1 shows an example of a graphic representation of a single formed light wave front with local vectors.

FIG. 1 shows an example of a single form of a light wave front WF. The form of the light wave front WF can be described locally with the help of vectors $V1 \ldots Vn$ for separate partial light waves. The vectors $V1 \ldots Vn$ are perpendicular to the propagating wave front WF. Each of the vectors $V1 \ldots Vn$ includes a normal vector, which has a uniform length, and which exhibits an angle both to the x-z plane and to the y-z plane.

Figure 2:
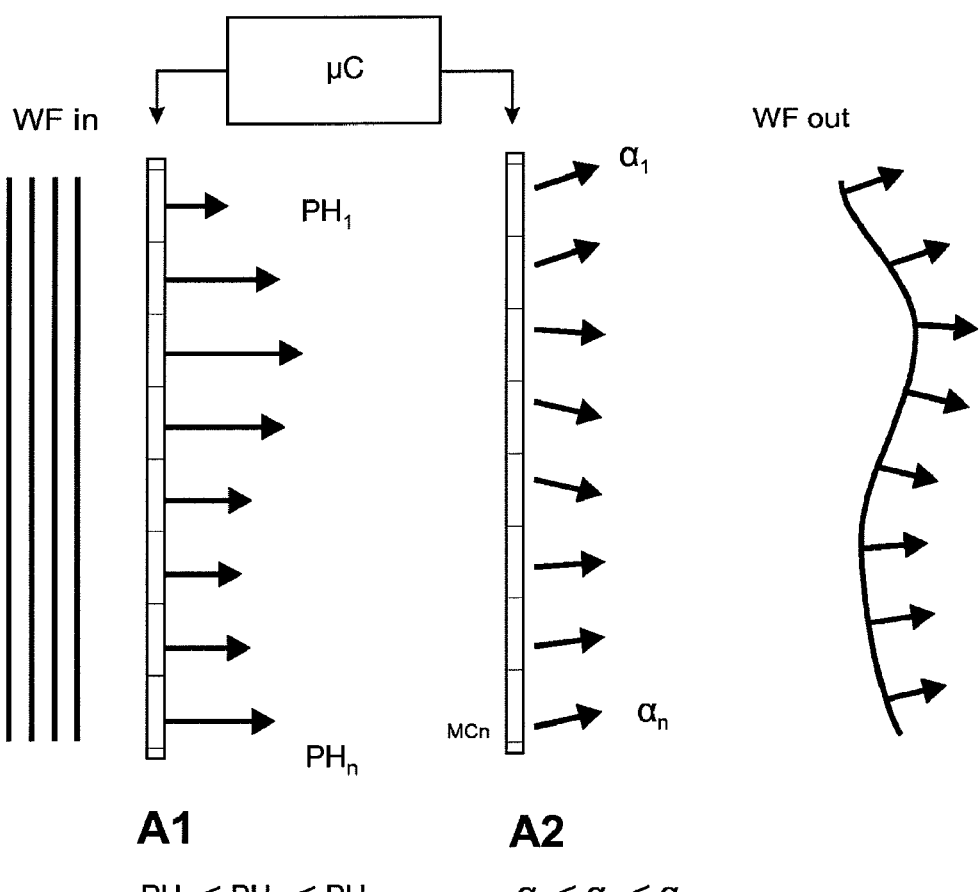
FIG. 2 shows the functional principle according to the invention with the major components for a preferred embodiment of a wave former unit.

FIG. 2 shows a preferred embodiment of the invention. The shown wave front forming unit comprises, according to the invention, a plane wave front WFIN, which propagates in a collimated manner towards a first transmissive cell array A1 and then towards a second transmissive cell array A2. Each of the transmissive cell arrays A1 and A2 has a modulator surface with light modulator cells $MC1 \ldots MCn$, where each of those cells have a cross-section of few micrometers and are made of a transparent medium, which exhibits wave propagation properties which differ from those of air or water. Each light modulator cell includes control electrodes (not shown), which can preferably also be designed such to effect an influence on the field, said influence acting in a laterally different way, i.e. in two dimensions (x, y). A computer-aided cell controller µC modifies with the help of control electrodes for each modulator cell the length or form of the light path through the transparent medium. This way, the cell controller µC can change the light path lengths of the modulator cells of the cell array A1, in order to affect the local phase shift PHm, PH1 ≦PHm≦PHn of the corresponding partial wave front. Independent of that, the cell controller μC can change the prism form of the modulator cells of the cell array A2, in order to control the local direction vector αm, α1≦αm≦αn so to achieve a desired local propagation direction, thereby correcting for example direction-specific wave propagation errors. In doing so, the cell structure generally splits an incident wave front WFIN into a bundle of partial light wave fronts, and it determines with its cross-section and the number of modulator cells also the array structure of the partial light wave fronts in the emitted wave front WFOUT.

Provided the cell structures of the two cell arrays are identical, the surface of the emitted wave front WFOUT also has the same array structure as the modulator surface. Each partial light wave of the emitted wave front WFOUT is thus functionally assigned with an optical series connection of modulator cells.

While the cell controller μC controls in one cell array with a separate electric control value the phase condition of a partial light wave in the assigned modulator cell, the cell controller μC affects in the corresponding modulator cell of the following cell array with a second control value the direction of propagation of the same partial light wave.

Each cell array preferably has cell addressing means in order to let the cell controller μC address the control electrodes of each modulator cell independently of the other cells. It is thus possible for each partial light wave which is emitted by the cell arrays to control discretely both an individual phase value and an individual direction of propagation.

Thanks to its interaction with the cell controller μC and the cell addressing means, the wave former unit can realise a spatial light modulator which is capable of forming three-dimensional wave structures. In order to control the spatial parameters of the light wave front, the cell controller μC can be supplied with data records with complex light point values which describe the positions of desired light points in a space.

Because the wave fields of the wave former unit can be realised to have large areas, and because they exhibit a high refresh rate, the wave former unit can in particular be used preferably for a holographic reconstruction of video holograms.

In contrast to a diffraction grating which is designed in the form of a so-called blaze grating, and which is optimised in respect to its grating diffraction, the cell array which implements the prism function can realise separate local direction vectors am for each partial wave front.

As any optical gratings, the cell arrays according to the invention also have a constant spacing thanks to the uniform cross-section of the modulator cells. However, the light emission surfaces of the modulator cells have a roof form which can be set to various roof angles which represent mainly a non-equilateral triangle in the cross-section and which form a modulator surface with a staged structure.

By way of specifically affecting that form of the grating elements, it is achieved that the intensity of the diffracted radiation shows a maximum in the desired diffraction order, and that the grating exhibits a high efficiency in the desired wavelength range.

Figure 3A:
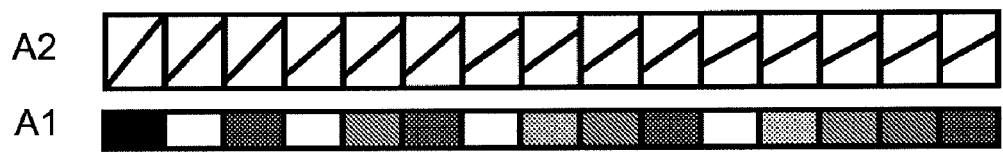
FIG. 3 is a side view of the cell arrays showing a row of modulator cells each, as a detail of a cell array with controlled prism function or with controlled phase value.
Figure 3B:
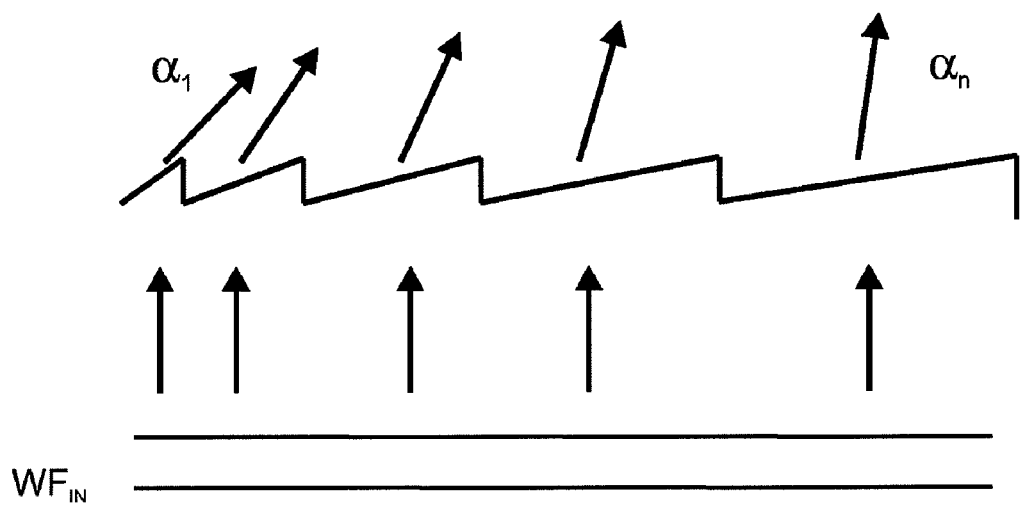

According to a special embodiment of the invention, which is shown in FIGS. 3a and 3b, the function of modulator cells which are encoded as prisms can be combined in order to realise for example in addition to a variable roof angle also variable cell periods.

There is a constant roof angle over a synthetic prism period which is composed of multiple modulator cells. This angle can be controlled for each of the combinations of the modulator cells. However, in order to simulate a surface relief grating with a variable roof angle and a variable period, combined modulator cells, which lie within the synthetic period, must realise phase shifts of up to $2\pi$ in difference to each other.

A coherently illuminated cell array, which is realised in the form of switchable micro-prisms, shall be treated as a diffractive structure. As a whole, it exhibits properties which are the same as those of surface relief gratings, for example a non-continuous angular deflection of the modulated wave field. If the prism angles in the cell array are modified, then the diffraction efficiencies in the individual diffraction orders of this wave field will change. This means that the intensities are distributed and represented in relation to angles which are determined by the grating equation. Therefore, there are always positions between the diffraction orders where there is no light energy, and where consequently no observer window can be positioned if the array is used in a holographic 3D display. This disadvantage can be compensated by way of a phase continuation.

Phase continuation is a measure taken to compensate the phase jumps which occur in conjunction with the discrete switching of the deflection angles in switchable micro-prisms. This can be achieved in that adjacent micro-prisms of a cell array are combined to form a single cell with a synthetically created period, e.g. 10×10 micro-prisms for a 2D encoding, or 1×10 micro-prisms in rows for a 1D encoding. Changed synthetic periods make it possible to realise continuously variable deflection angles.

The phase continuation is realised in that additional elements which shift the phase of the wave field are provided in the cell array. The position of the diffraction orders can be specifically displaced laterally with the micro-prisms and the additional elements. The observer window of a holographic 3D display which is situated in the far field of the cell array between two diffraction orders can thus be displaced continuously. According to this invention, each micro-prism is assigned with a controllable phase-shifting element. These elements are preferably be disposed in the optical path before the cell array of micro-prisms. The individual micro-prisms are capable of setting a target angle locally in two planes. The phase-shifting elements generate continuous phase values in a range of up to $2\pi$.

If temporally sufficiently coherent light is used, the phase continuation must only be performed modulo $2\pi$.

An array with such elements makes it possible to obtain a continuous phase gradient in the wave field and to generate continuous phase transitions. This also allows the wave field to be formed dynamically in a purposeful manner.

If a phase encoding is sufficient when reconstructing a 3D object, the array described above represents a phase-shifting SLM to which holograms, i.e. phase values, can be written.

According to another embodiment, the SLM which is illuminated with plane wave fields can also realise the function of a field lens.

These possibilities will be discussed in more detail with reference to FIG. 4.

FIG. 4 shows various options for variably forming a wave front WF with the help of the wave former unit according to this invention. As shown in FIG. 4a, the wave former unit can straighten a deformed wave front.

As shown in FIG. 4b, the wave former unit can alternatively emit curved wave fronts. This way, for example, almost any function of focussing elements can be realised by respectively encoding a cell array. As cell arrays with modulator cells which exhibit cross-sections of few micrometers realise a high resolution, the cell controller μC can also encode in a cell array the function of an adaptive lens array, for example in order to supply a wave front from a light source array, which comprises multiple light sources arranged in a matrix.

The control signal of a cell array, which is illuminated with plane waves, and which is encoded with image information, and which thus serves as a spatial light modulator SLM, can be superimposed by an additional lens function. The cell array thus additionally realises the function of a field lens, for example.

The cell controller means µC can thus at least partly encode with holographic information at least one cell array A1 or A2 of the wave former unit depending on a current video hologram, such that at least one cell array realises the function of a spatial light modulator in a holographic reconstruction system.

As shown in FIG. 4c, the control signals for the cell controller µC can alternatively realise a combination of different optical functions, such as bending and tilting a wave front. A modulated wave front can thus also be directed at a certain position in space with the help of a corresponding control signal component.

This application is for example of great importance when tracking holographic reconstructions to the eyes of observers.

The solution according to this invention is able to change the wave front dynamically such that within the individual controlled modulator cells a gradient of the phase is realised such that the diffraction efficiency of individual diffraction orders is specifically increased.

In contrast to binary phase gratings, cell arrays which operate on the basis of controllable diffraction gratings, are able to realise a diffraction efficiency of almost 100% in a specific diffraction order.

Thanks to the wave former unit according to this invention, it is possible to realise a continuous phase control, thus adapting laterally the position of the used diffraction orders as desired.

The dynamic modulation of a wave front can be realised both in a transmissive or reflective mode.

A great advantage of the invention is that with the wave former unit a particularly flat and light-weight optical system can be realised which has a great dynamic range and a diffraction efficiency which is higher than that of conventional binary phase modulation. It can compensate at a fast pace ambient influences, such as fluctuations in local temperature, humidity, composition and density of a medium in the propagation space, and correct a maladjustment of individual optical components of the system. An improved design freedom for the modulation of the incident wave front is achieved if variable phase, amplitude and angle values are introduced.

Preferably, it can be taken advantage of apodisation in the illumination beam path of the modulator cells in order to suppress adjacent orders, if they have a disturbing effect in the optical system, or if they cannot be filtered out with simple means.

The invention claimed is:

1. Dynamic wave former unit with light modulator cells for spatial light modulation, said light modulator cells being arranged in a regular pattern in cell arrays, for setting separately both locally different phase shifts and different deflection angles in emitted partial light waves based on an incident light wave front, wherein Arrays of modulator cells are disposed serially in the optical path of the light wave front, which are controlled by cell controller means In a first cell array such that the modulator cells discretely realize a phase shift with a continuous phase value, and In a second cell array (A2) such that the modulator cells realize a prism function with a continuous direction value ($\alpha m$) for the partial light waves, And in that means which realize a focusing function for the emitted wave front are disposed in the light path of the optical unit, said focusing function directing the partial light waves of the optical unit at a common position in the exit pupil.

2. Wave former unit according to claim 1, where at least one cell array comprises electrowetting cells.

3. Wave former unit according to claim 2, where the cell controller means control the electrowetting cells of one cell array such that they realize controllable prism functions.

4. Wave former unit according to claim 1, where the cell controller means control the electrowetting cells such that they realize controllable phase-shifting functions.

5. Wave former unit according to claim 4, where the cell controller means control each electrowetting cell such that it realises a phase-shifting function of between $-\pi$ and $+\pi$, related to a rest position.

6. Wave former unit according to claim 1, where the cell arrays have an identical cell structure.

7. Wave former unit according to claim 1, where one cell array comprises controllable micro-prisms.

8. Wave former unit according to claim 1, where one cell array realises at least additionally the focusing function.

9. Wave former unit according to claim 1, comprising at least one further cell array.

10. Wave former unit according to claim 9, where the modulator cells of the further cell array can be controlled locally to realize different luminance values, in order to compensate losses of light which are caused by the settings of the other cell arrays.

11. Wave former unit according to claim 1, where a cell array realises a function of an array with multiple lenses.

12. Wave former unit according to claim 1, where the cell controller means at least partly encode at least one cell array with holographic information, depending on a current video hologram, in order to realize the prism functions and/or phase shifts, such that at least one cell array realises the function of a spatial light modulator in a holographic reconstruction system.

13. Wave former unit according to claim 1, where the controller means encode at least one cell array so to realize the prism functions and/or phase shifts in dependence on at least one eye position of an observer eye, in order to adapt the direction of propagation of the light wave to the eye position.

14. Wave former unit according to claim 13, where the controller means encode one cell array with a prism function, in order to laterally adjust the emitted wave front, and where they additionally encode one cell array with a lens function, in order to focus the emitted wave front axially to different focal points.

15. Wave former unit according to claim 1, where at least one cell array in a holographic reconstruction system represents the size of the display screen and/or realises the same.

16. Wave former unit according to claim 1, where at least one cell array and parts of the cell controller means form a compact unit.

17. Wave former unit according to claim 1, where at least one cell matrix comprises control addressing means for each modulator cell, in order to separately control the optical behaviour of all modulator cells.

18. Wave former unit according to claim 1, where at least one cell matrix is addressed through an electronic data bus.

19. Wave former unit according to claim 1, where at least one cell matrix is addressed through an opto-electronic data bus.

20. Wave former unit according to claim 1, which is illuminated by an array of illumination elements.

* * * * *